United States Patent
Wadia et al.

(10) Patent No.: US 11,274,810 B1
(45) Date of Patent: Mar. 15, 2022

(54) GASKET WITH INTEGRATED STRUCTURAL SUPPORT

(71) Applicant: ABL IP Holding LLC, Atlanta, GA (US)

(72) Inventors: Anosh Porus Wadia, Tucker, GA (US); Brent James Smith, McDough, GA (US); Robert M. Makulinski, Lawrenceville, GA (US); Luke J. Siefker, Atlanta, GA (US)

(73) Assignee: ABL IP Holding LLC, Atlanta, GA (US)

( * ) Notice: Subject to any disclaimer, the term of this patent is extended or adjusted under 35 U.S.C. 154(b) by 0 days.

(21) Appl. No.: 17/178,825

(22) Filed: Feb. 18, 2021

(51) Int. Cl.
  *F21V 15/04* (2006.01)
  *F16J 15/08* (2006.01)
(52) U.S. Cl.
  CPC ........... *F21V 15/04* (2013.01); *F16J 15/0818* (2013.01)

(58) Field of Classification Search
  CPC ...... F21V 15/04; F21V 21/108; F21V 21/116; F21V 31/00; F21V 31/005; F16J 15/0818
  See application file for complete search history.

(56) References Cited

U.S. PATENT DOCUMENTS

| | | | |
|---|---|---|---|
| 7,891,835 B2 | 2/2011 | Wilcox et al. | |
| 8,282,239 B2 | 10/2012 | Wilcox et al. | |
| 8,960,971 B1 | 2/2015 | Newton | |
| 9,759,409 B2 | 9/2017 | Durdle et al. | |
| 9,835,314 B1 | 12/2017 | Wright | |
| 10,738,982 B1 * | 8/2020 | Orellana | F21S 8/086 |
| 2004/0095773 A1 | 5/2004 | Gaskins et al. | |

* cited by examiner

*Primary Examiner* — Thomas M Sember
(74) *Attorney, Agent, or Firm* — Kilpatrick Townsend & Stockton LLP

(57) ABSTRACT

Certain aspects involve a lighting system including a compressible gasket. The gasket can include front and back surfaces and at least one substantially rigid support embedded within the gasket. The embedded support can be positioned within the gasket so as not to be exposed on the front or back surfaces of the gasket.

20 Claims, 3 Drawing Sheets

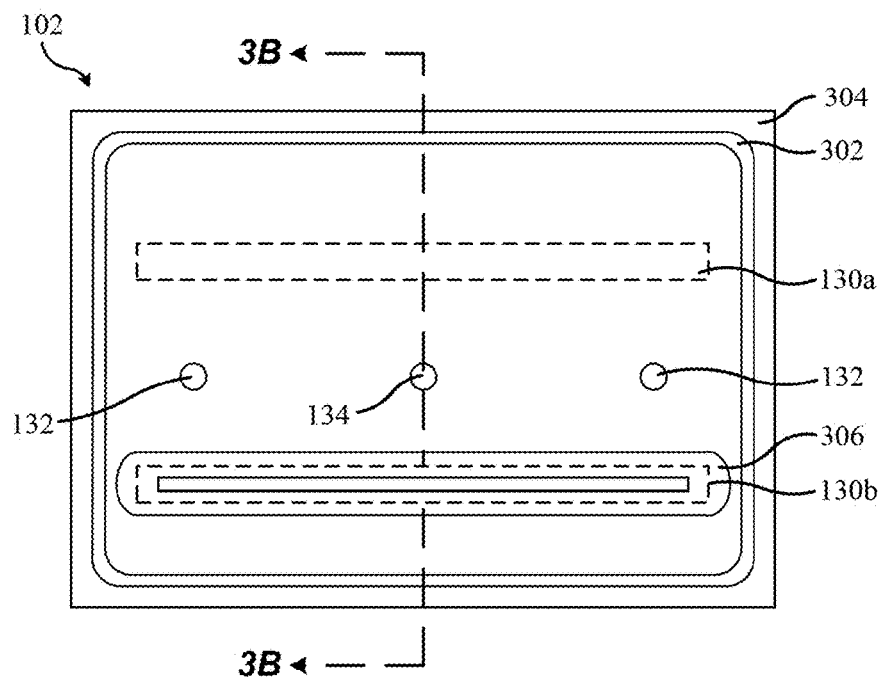
FIG. 3A
FIG. 3B
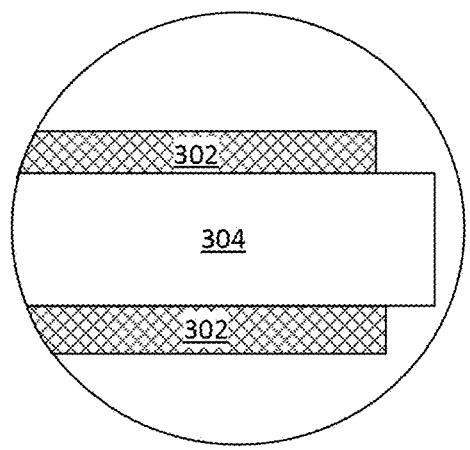
FIG. 3C
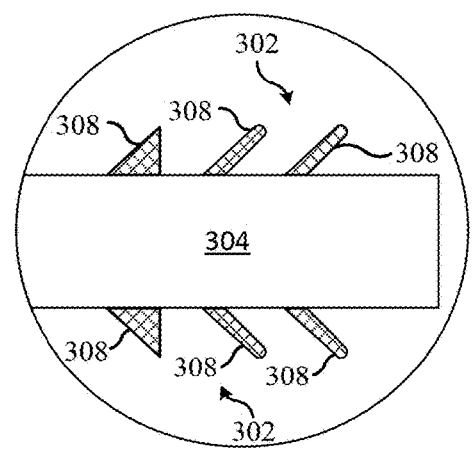
FIG. 3D

GASKET WITH INTEGRATED STRUCTURAL SUPPORT

TECHNICAL FIELD

This disclosure relates generally to a gasket for use with a lighting system. More specifically, but not by way of limitation, this disclosure relates to a gasket with integrated structural support that can control the compression of the gasket.

BACKGROUND

Light fixtures can include multiple components connected together at joints. For example, light fixtures can include a housing connected to a mounting arm. Gaskets are often interposed between adjacent components at the joints. The gaskets can be compressed between mating surfaces of the components of the light fixture to create a seal that prevents or reduces debris and moisture from entering the joints. However, the gaskets can be compressed unevenly by the mating surfaces or the mating surfaces can have geometries that can cause the gaskets to form a weak seal between the components. The uneven compression of the gaskets or the weak seal can allow debris and moisture into the joints that can detrimentally impact operation of the light fixture.

SUMMARY

Certain aspects include a lighting system. The lighting system also includes a gasket formed of a compressible material and including a first surface, a second surface opposite the first surface, and at least one rigid support encapsulated within the gasket. The lighting system also includes a mounting arm having an engagement surface. The lighting system also includes a light fixture adapted to attach to the mounting arm and including a light fixture housing and a light source, the light fixture housing having an attachment surface. The lighting system also includes where, when light fixture is attached to the mounting arm, the gasket is interposed between the engagement surface of the mounting arm and the attachment surface of the light fixture housing and the at least one rigid support in the gasket is configured to maintain a consistent distance between the engagement surface of the mounting arm and the attachment surface of the light fixture housing. Other embodiments of this aspect can include corresponding systems and/or apparatuses.

One general aspect includes a gasket formed of a compressible material and. The gasket also includes a first surface and an opposing second surface spaced from the first surface by a thickness of the gasket. The gasket also includes at least one substantially rigid support embedded within the gasket. Other embodiments of this aspect can include corresponding systems and/or apparatuses.

One general aspect includes a system. The system also includes a gasket formed of a compressible material and including a first surface, a second surface opposite the first surface, and a plurality of substantially rigid supports embedded within the gasket. The system also includes a first solid body having an engagement surface. The system also includes a second solid body having an attachment surface. The system also includes where, when the first solid body is attached to the second solid body, the gasket is interposed between the engagement surface of the first solid body and the attachment surface of the second solid body, and where the gasket is configured to conform to a shape of the engagement surface or the attachment surface and the plurality of supports are configured to maintain a consistent distance between the engagement surface and the attachment surface. Other embodiments of this aspect can include corresponding systems and/or apparatuses.

These illustrative aspects are mentioned not to limit or define the disclosure, but to provide examples to aid understanding thereof. Additional aspects are discussed in the Detailed Description, and further description is provided there.

BRIEF DESCRIPTION OF THE DRAWINGS

Features, aspects, and advantages of the present disclosure are better understood when the following Detailed Description is read with reference to the accompanying drawings.

FIG. 3A is a front elevation view of an example gasket for use with the light system of FIG. 1, according to certain aspects of the present disclosure.

FIG. 3B is a cross-sectional view taken along line 3B-3B of FIG. 3A.

FIGS. 3C and 3D are side plane views of portions of embodiments of gaskets that include example flanges, according to certain aspects of the present disclosure.

DETAILED DESCRIPTION

Lighting systems, for example, outdoor lighting systems, are often formed by multiple components connected together. Gaskets are often positioned between mating components to create a seal that reduces or prevents debris and moisture from entering the joint. Traditional gaskets (e.g., gaskets that do not include structural support features) can often compress unevenly, which can allow debris and moisture to enter the joint. The debris or moisture can weaken the joint, allowing the components of the lighting system to move, or can cause the joint to fail completely.

Certain aspects described herein include improved gaskets for use with a lighting system. For example, certain aspects involve a gasket with an integrated structural support system that helps control the compression of the gasket. The gasket can include one or more structural inserts sized, shaped, and/or positioned within the gasket to allow for uniform compression of the gasket. For example, the structural inserts can have a thickness that prevents the gasket from being over compressed and located to ensure uniform gasket compression. The gasket with integrated structural supports allows for proper assembly of a sealed joint with components joined at an angle. Turning to a specific, non-limiting example, the gasket can be a silicone gasket with one or more co-molded metallic inserts. The gasket can be positioned between components with curved mating faces and allow the components to be attached to one another at an angle (e.g., an angle between 0 degrees and 45 degrees). The gasket can be uniformly compressed to form a seal between the components to prevent or reduce moisture and debris from entering the joint.

Figure 1:
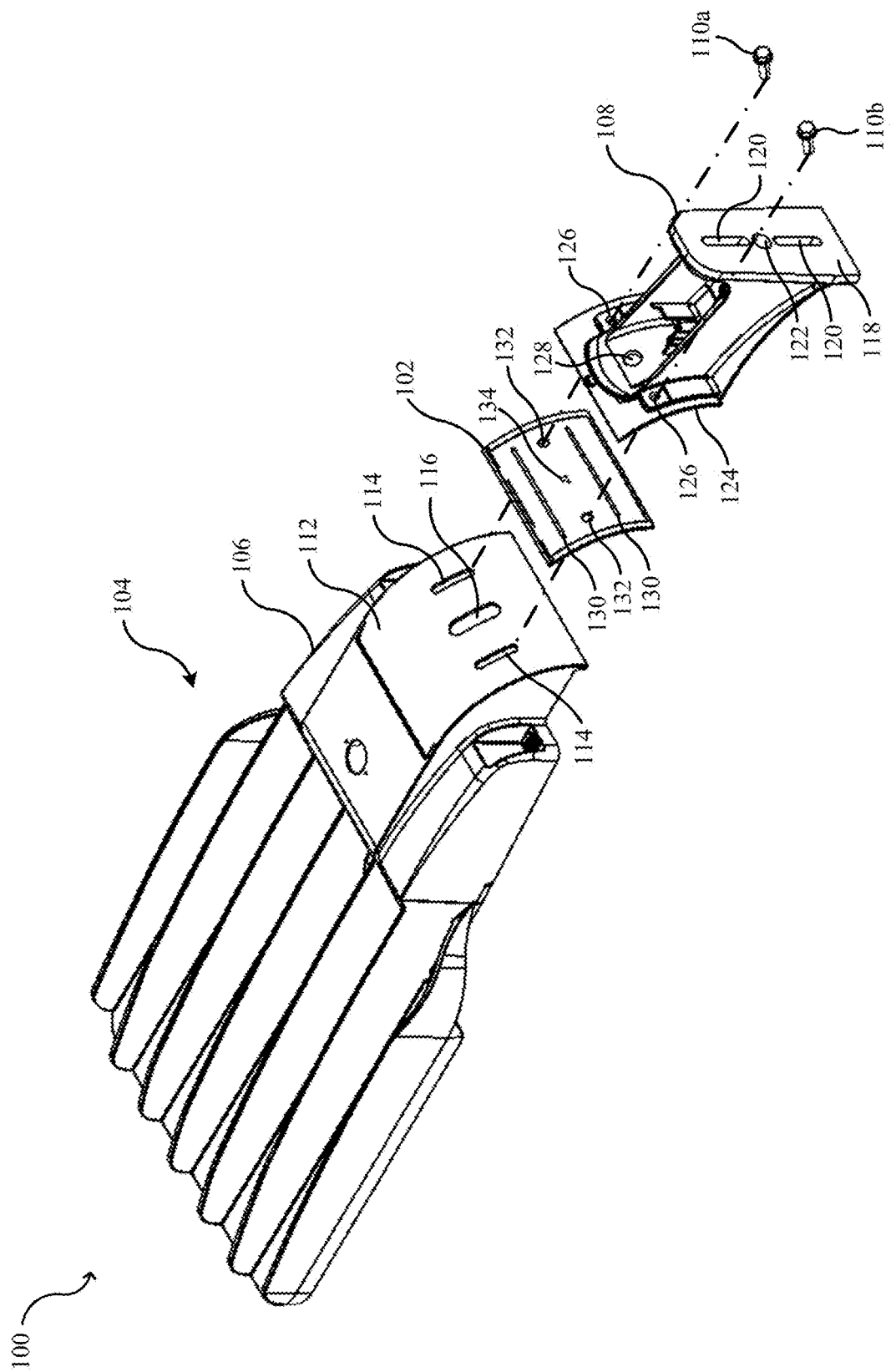
FIG. 1 is an exploded view of an embodiment of a light system including a gasket, according to certain aspects of the present disclosure.

Turning now to the figures, FIG. 1 depicts an example of a light system 100 that includes an embodiment of a gasket 102, according to certain aspects of the present disclosure. The gasket 102 can be positioned between the light fixture 104 and a mounting arm 108 that attaches the light fixture 104 to a mounting structure, such as, but not limited to, a wall, a pole, etc. One or more fasteners 110 can be used to connect together the mounting arm 108, the gasket 102, and/or the light fixture 104. For example, fasteners 110a and 110b can extend through openings in the mounting arm 108, the gasket 102, and the light fixture 104 and connect the pieces to one another. The fasteners 110 can be or include bolts, nuts, washers, screws, nails, threaded fasteners, hook and loop connectors, and/or any suitable device for connecting the pieces of the light system 100.

The light fixture 104 can include a housing 106 that houses one or more light engines (not shown) and electronics for powering the light engines. The housing 106 protects the light engine and electronics from moisture and/or debris. The housing 106 may be formed from any material having sufficient structural rigidity, including, but not limited to, metallic and polymeric materials. The light fixture 104 can include an attachment surface 112 (e.g., a mounting surface or an engagement surface) onto which the mounting arm 108 is attached. A gasket 102 is interposed between the light fixture 104 and the mounting arm 108. In some embodiments, the attachment surface 112 can have a geometry that allows for variable mounting of the light fixture 104. For example, the attachment surface 112 can have a curved geometry and elongated mounting apertures 114 that can allow the light fixture 104 to be mounted at various angles relative to the mounting arm 108. In various embodiments, the light fixture 104 can include one or more wire apertures 116, for example, for feeding of cables and/or wiring through. For example, the light fixture 104 can include wire apertures 116 that can receive wiring to power the light engine.

The mounting arm 108 can be mounted to a support structure (e.g., to a wall, pole, post, or similar structure) and to the light fixture 104, so as to support the light fixture 104 on the support structure. One end of the mounting arm 108 can include a mounting surface 118 that can engage with the support structure. The mounting surface 118 can include one or more mounting apertures 120 and wire apertures 122 to respectively receive fasteners and/or accommodate wiring. For example, wiring can be feed through wire aperture 122 of the mounting arm 108 and fasteners can extend through the mounting apertures 120 to attach the mounting arm 108 to the support structure.

The opposing end of the mounting arm 108 can include an engagement surface 124 (e.g., an attachment surface or a mounting surface) for attachment to the light fixture 104 with the gasket 102 interposed therebetween. The engagement surface 124 can have geometry that matches (e.g., substantially matches and/or is complimentary to) the geometry of the attachment surface 112 of the light fixture 104. For example, the engagement surface 124 can have a curved geometry that matches the curved geometry of the attachment surface 112. As described further in reference to FIGS. 2A and 2B, the geometry of the engagement surface 124 and/or the attachment surface 112 can allow the light fixture 104 to be mounted at an angle relative to the mounting arm 108 and/or can allow the light fixture 104 to pivot relative to the mounting arm 108. In various embodiments, the engagement surface 124 is provided with one or more mounting apertures 126 for receiving fasteners 110a, 110b and one or more wire apertures 128 for receiving wiring (via wire aperture 128) for powering the light fixture 104.

In various embodiments, the attachment surface 112, the mounting surface 118, and/or the engagement surface 124 can include material and/or geometry that increases friction between the mounting surfaces and the components they are engaged with. For example, the attachment surface 112, the mounting surface 118, and/or the engagement surface 124 can include rubber, silicone, or similar material that increases friction between the components.

The gasket 102 can be positioned between the light fixture 104 and the mounting arm 108. For example, the gasket 102 can be positioned between the attachment surface 112 of the light fixture 104 and the engagement surface 124 of the mounting arm 108. In some embodiments, the gasket 102 can include one or more wire apertures 134 for receiving wiring and/or a cable and one or more mounting apertures 132 for receiving fasteners 110a, 110b. A joint containing a gasket 102 can have increased durability (e.g., can last longer) compared to a joint without a gasket. For example, the gasket 102 can be positioned between the light fixture 104 and the mounting arm 108 to prevent moisture and/or debris from entering the joint between the components.

The gasket 102 can be compressed between the light fixture 104 and the mounting arm 108. For example, the gasket 102 can be compressed by the light fixture 104 moving toward the mounting arm 108, for example, when the light fixture 104 is being fixed in position. The gasket 102 positioned between the light fixture 104 and the mounting arm 108 can increase the strength of the joint between the light fixture 104 and the mounting arm 108 compared with a joint that does not include a gasket. For example, the gasket 102 can allow the light fixture 104 to be mounted at an angle relative to the mounting arm 108 and the gasket 102 can prevent the light fixture 104 from slipping (e.g., moving or falling).

In various embodiments, the gasket 102 can include one or more inserts 130 that can act as structural supports. The inserts 130 can aid in controlling the torque of the fasteners 110 used to connect the light fixture 104 and the mounting arm 108, can aid in repeated compression of the gasket 102 with minimal or no impact to the integrity of the gasket 102, and/or can act as a mechanical stop to prevent the gasket 102 from being compressed beyond a desired thickness. For example, the inserts 130 can prevent the gasket 102 from being over compressed between the light fixture 104 and the mounting arm 108. By controlling the compression of the gasket 102, the inserts 130 can prevent the gasket from experiencing compression set (e.g., the inserts 130 can prevent the gasket 102 from being compressed to a point where the gasket 102 will no longer return to the original thickness). The inserts 130 can additionally or alternatively aid in dampening of the light system 100. For example, the inserts 130 can dampen vibration of the mounting arm 108 and/or the light fixture 104.

The inserts 130 can be co-molded with the gasket 102 (e.g., positioned in the gasket 102 while the gasket 102 is being formed). For example, a portion of the gasket 102 can be formed and the inserts 130 can be positioned in the gasket 102 while the remainder of the gasket 102 is formed around the inserts 130. The inserts 130 can additionally or alternatively be positioned into the gasket 102 after the gasket 102 has been formed. For example, the inserts 130 can be positioned in an opening in the gasket 102). The inserts 130 can be formed of a strong material that can withstand the compression forces from the light fixture 104 and the mounting arm 108. For example, the inserts 130 can be formed of a metal material (e.g., steel, aluminum, iron, titanium, etc.), a rigid plastic material (e.g., resin, ABS), and/or materials with similar strength properties. Embodiments of the gasket 102 are discussed in more detail below.

The fasteners 110 can be used to attach the components (e.g., the light fixture 104, the gasket 102, and the mounting arm 108) of the light system 100. For example, mounting apertures 114, 126, and 132 can be aligned and a fastener 110 can be inserted through the mounting apertures 114, 126, 132. The fasteners 110 can exert a compression force on the components of the light system 100 to hold the components together. For example, the fasteners 110 can be tightened to exert a clamping force. The wire apertures 116, 122, 128, and 134 can additionally or alternatively be aligned to receive a cable and/or wiring. For example, the cable can be fed from the mounting substrate through the mounting arm 108, gasket 102, and light fixture 104 and can be used to power the light fixture 104.

Figure 2A:
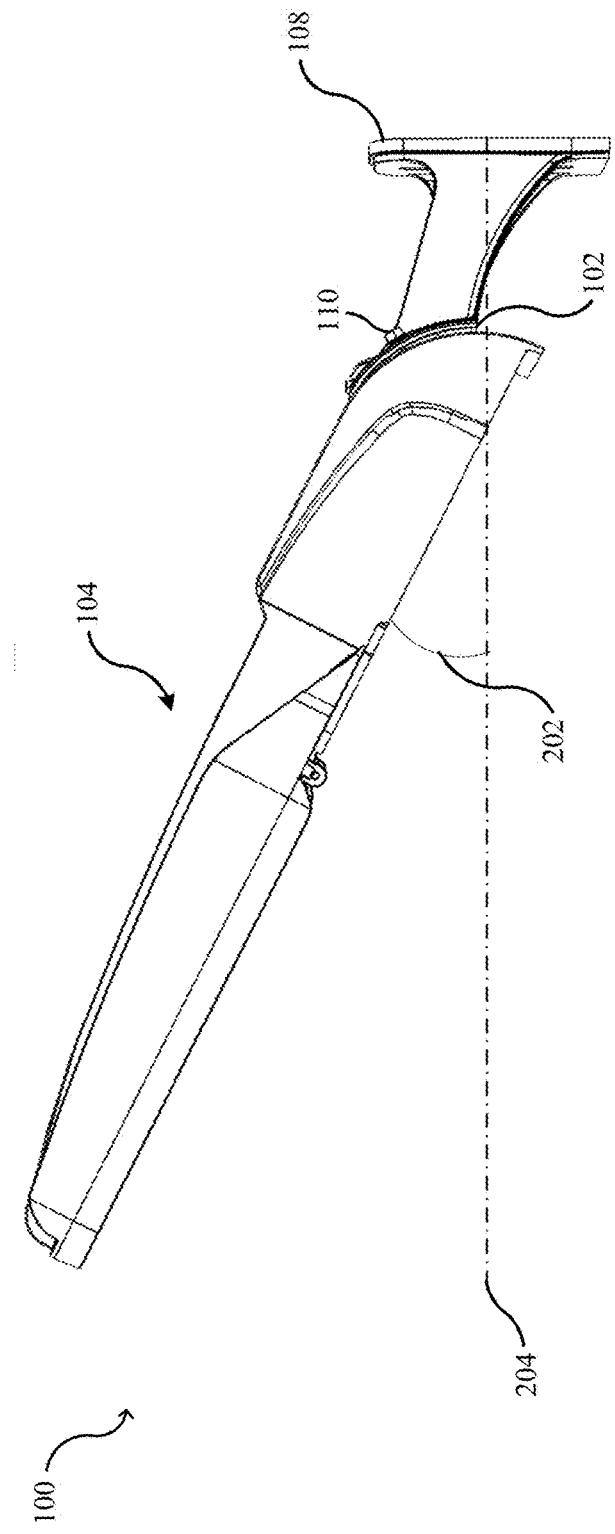
FIGS. 2A and 2B are side elevations view of the assembled light system of FIG. 1 and depict alternative mounting positions for the light system of FIG. 1, according to certain aspects of the present disclosure.
Figure 2B:
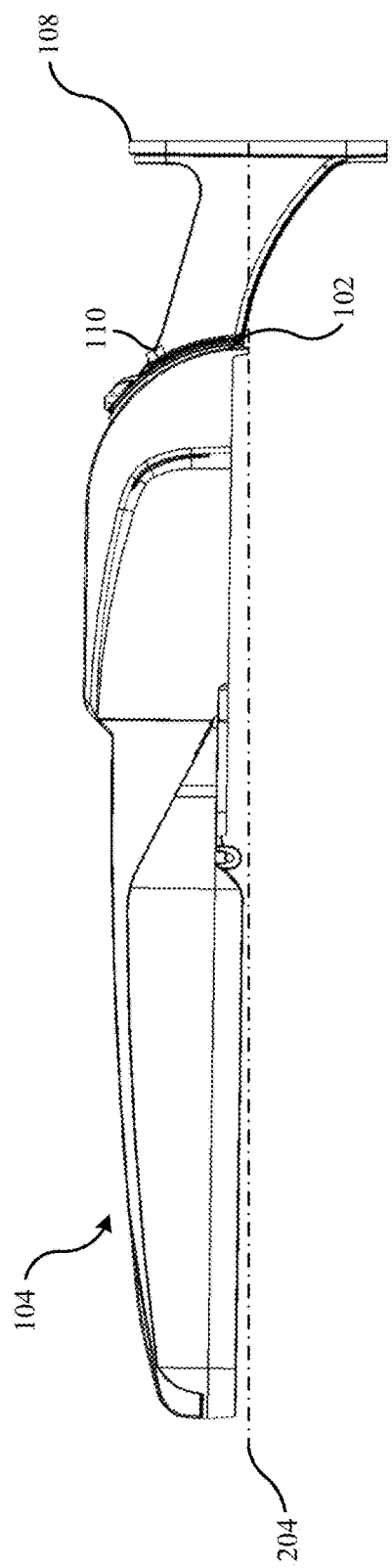

As shown in FIGS. 2A and 2B, the light fixture 104 and the mounting arm 108 can be mounted at an angle 202 relative to one another. For example, the light fixture 104 can be mounted at an angle 202 above and/or below axis 204. FIG. 2A depicts the light fixture 104 mounted at an angle 202 above the axis 204 and FIG. 2B depicts the light fixture 104 mounted along the axis 204. The angle 202 can be any degree but an angle 202 in a range between sixty degrees below axis 204 to sixty degrees above axis 204 will typically be suitable for most applications. For example, The axis 204 can be or include a horizontal or generally horizontal axis, an axis normal to or generally normal to the mounting structure to which mounting arm 108 is mounted, and/or any suitable axis. The gasket 102 can aid in holding the light fixture 104 at the angle 202 (e.g., by preventing the light fixture 104 from slipping or falling from the mounted position).

The light fixture 104 can be mounted to the mounting arm 108, for example, using fasteners 110. The light fixture 104 can be positioned at an angle 202 and the fasteners 110 can fix the light fixture 104 in position. Elongated mounting apertures 114 (as opposed to circular holes) can be provided in the attachment surface 112 to accommodate insertion of the fasteners 110 when the light fixture 104 and mounting arm 108 are oriented at different relative angles. The light fixture 104 can be fixed in position, for example, by applying a clamping force (e.g., by tightening fasteners 110) to the light fixture 104 and the mounting arm 108. The clamping force can compress the gasket 102 positioned between the light fixture 104 and the mounting arm 108. The gasket 102 can compress until the inserts 130 resist the clamping force. For example, the inserts 130 can prevent the light fixture 104 and the mounting arm 108 from over compressing or causing compression set in the gasket 102 (e.g., the inserts 130 can stop the gasket 102 from being compressed between the light fixture 104 and the mounting arm 108 until the gasket 102 cannot expand back to the original thickness).

In various embodiments, the light fixture 104 can be positioned at multiple mounting positions. For example, the light fixture 104 can be mounted at a first position (e.g., as shown in FIG. 2A) and moved to a second position (e.g., as shown in FIG. 2B). Moving the light fixture 104 between mounting positions can include loosening the light fixture 104 (e.g., loosening the fasteners 110 until the light fixture 104 can pivot). Loosening the light fixture 104 can allow the gasket 102 to expand back to the original thickness. The light fixture 104 can move (e.g., pivot) to the second position and be fixed in place. For example, the light fixture 104 can be fixed in place at the second position using a clamping force. The light fixture 104 can continue to be moved between various positions using the same or a similar process of releasing the light fixture 104, moving the light fixture 104, and affixing the light fixture 104 at the new position.

Turning to FIGS. 3A through 3C, an example gasket 102 is shown. FIG. 3A is a front elevation view of the gasket 102, FIG. 3B is a cross-sectional side view of the gasket 102 taken along line 3B-3B in FIG. 3A, and FIGS. 3C and 3D are top plan views of portions of gaskets 102 that include a flange 302. The gasket 102 can include one or more inserts 130 positioned in a gasket body 304. As explained above, the inserts 130 can be substantially rigid. Any number of inserts can be provided in the gasket body 304. The inserts 130 can be provided as discrete elements or may be interconnected to each other. The gasket body 304 is formed from a compressible material, such as, but not limited to, silicone, silicon, rubber, and/or like material. The inserts 130 can be positioned wholly or partially within the gasket body 304. For example, as shown in FIGS. 3A and 3B, insert 130a is entirely encapsulated within the gasket body 304 (e.g., the insert 130a is entirely surrounded by the gasket body 304), whereas insert 130b is only partially positioned within the gasket body 304 (e.g., one or more sides of the insert 130b is exposed outside of the gasket body 304). In some embodiments, a portion of the gasket body 304 can be recessed and/or open to expose a portion of the inserts 130. For example, recess 306 and opening 310 can expose the top and bottom of insert 130b.

In various embodiments, a flange 302 can extend from one or both of the front and back surfaces of the gasket 102. The flange 302 at least partially surrounds the periphery of the gasket 102. The flange 302 can aid in creating a seal between the light fixture 104 and the mounting arm 108. For example, the flange 302 can create a seal that reduces or prevents debris and/or moisture from entering the joint between the light fixture 104 and the mounting arm 108.

As shown in FIGS. 3C and 3D, the flange 302 can have one or more geometrical shapes or designs. For example, as shown in FIG. 3C the flange 302 can include a rectangular design. The rectangular design can allow the flange 302 to compress and form a seal between the light fixture 104 and the mounting arm 108. As shown in FIG. 3D, the flange can include one or more arms 308 extending from the surface of the gasket 102. The arms 308 can extend at an angle relative to the surface of the gasket 102. For example, the arms 308 can extend at an angle in a range between 15 degrees and 60 degrees relative to the surface of the gasket 102. The arms 308 can bend, for example, in response to compression of the gasket 102.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

The invention claimed is:

1. A lighting system, comprising:
   a gasket formed of a compressible material and comprising a first surface, a second surface opposite the first surface, and at least one rigid support at least partially embedded within the gasket such that the at least one rigid support does not extend outwardly beyond the first and second surfaces;
   a mounting arm having an engagement surface; and
   a light fixture adapted to attach to the mounting arm and comprising a light fixture housing and a light source, the light fixture housing having an attachment surface,
   wherein, when light fixture is attached to the mounting arm, the gasket is interposed between the engagement surface of the mounting arm and the attachment surface of the light fixture housing such that the first surface of the gasket is engaged with the engagement surface and the second surface of the gasket is engaged with the attachment surface and the at least one rigid support in the gasket is configured to maintain a consistent distance between the engagement surface of the mounting arm and the attachment surface of the light fixture housing.

2. The lighting system of claim 1, wherein the engagement surface and the attachment surface are curved surfaces and the gasket is configured to conform to the curved surfaces.

3. The lighting system of claim 2, wherein the at least one rigid support comprises a first rigid support and a second rigid support spaced apart from the first rigid support, the first and second rigid supports positioned to allow the gasket to conform to the curved surfaces.

4. The lighting system of claim 1, wherein the rigid support is a support rod extending at least a portion of a width of the gasket.

5. The lighting system of claim 1, wherein the rigid support comprises at least one of steel, plastic, aluminum, iron, titanium, resin, or ABS.

6. The lighting system of claim 1, wherein the rigid support is fully embedded within the gasket so as not to be exposed on the first or second surfaces.

7. The lighting system of claim 1, wherein the light fixture is attached to the mounting arm at an angle that is adjustable.

8. The lighting system of claim 1, wherein the gasket further comprises a flange projecting from the first surface or the second surface and configured to, when the light fixture is attached to the mounting arm, form a seal between the engagement surface of the mounting arm and the gasket or the attachment surface of the light fixture housing and the gasket.

9. A gasket formed of a compressible material and comprising:
   a first surface and an opposing second surface spaced from the first surface by a thickness of the gasket; and
   at least one substantially rigid support at least partially embedded within the gasket such that the at least one rigid support does not extend outwardly beyond the first and second surfaces,
   wherein the gasket is configured to be interposed between a mounting arm and a light fixture such that the first surface is engaged with the mounting arm and the second surface is engaged with the light fixture.

10. The gasket of claim 9, wherein the at least one substantially rigid support is embedded within the gasket so as not to be exposed on either the first surface or the second surface of the gasket.

11. The gasket of claim 9, wherein the at least one substantially rigid support is exposed on at least one of the first surface or the second surface of the gasket.

12. The gasket of claim 9, further comprising a flange projecting from the first surface or the second surface.

13. The gasket of claim 9, wherein the at least one substantially rigid support comprises a first substantially rigid support and a second substantially rigid support spaced from the first substantially rigid support.

14. The gasket of claim 9, wherein the gasket defines at least one opening that extends through the thickness of the gasket and is exposed on the first and second surfaces, wherein the opening is configured to receive at least one of a wire, cable, or fastener.

15. The gasket of claim 9, wherein the one substantially rigid support is a support rod extending across at least a portion of a width of the gasket and comprising at least one of steel, plastic, aluminum, iron, titanium, resin, or ABS.

16. A system, comprising:
   a gasket formed of a compressible material and comprising a first surface, a second surface opposite the first surface, and a plurality of substantially rigid supports at least partially embedded within the gasket, each of the plurality of substantially rigid supports not extending outwardly beyond the first and second surfaces;
a first solid body having an engagement surface; and
a second solid body having an attachment surface,
wherein, when the first solid body is attached to the second solid body, the gasket is interposed between the engagement surface of the first solid body and the attachment surface of the second solid body such that the first surface is engaged with the engagement surface and the second surface is engaged with the attachment surface, and wherein the gasket is configured to conform to a shape of the engagement surface or the attachment surface and the plurality of rigid supports are configured to maintain a consistent distance between the engagement surface and the attachment surface.

17. The system of claim 16, wherein the plurality of substantially rigid supports comprises first and second support rods spaced apart from one another.

18. The system of claim 16, wherein the first solid body is attached to the second solid body at an angle that is adjustable.

19. The system of claim 16, wherein a first mounting hole extends through the gasket and is exposed on the first and second surfaces and the system further comprises one or more fasteners configured to extend through the first mounting hole.

20. The lighting system of claim 1, wherein the at least one rigid support is exposed on at least one of the first surface or the second surface of the gasket.

\* \* \* \* \*